C. L. JOHNSON.
GEAR SHIFT LEVER LOCK.
APPLICATION FILED DEC. 4, 1920.
Reissued May 17, 1921. 15,105.
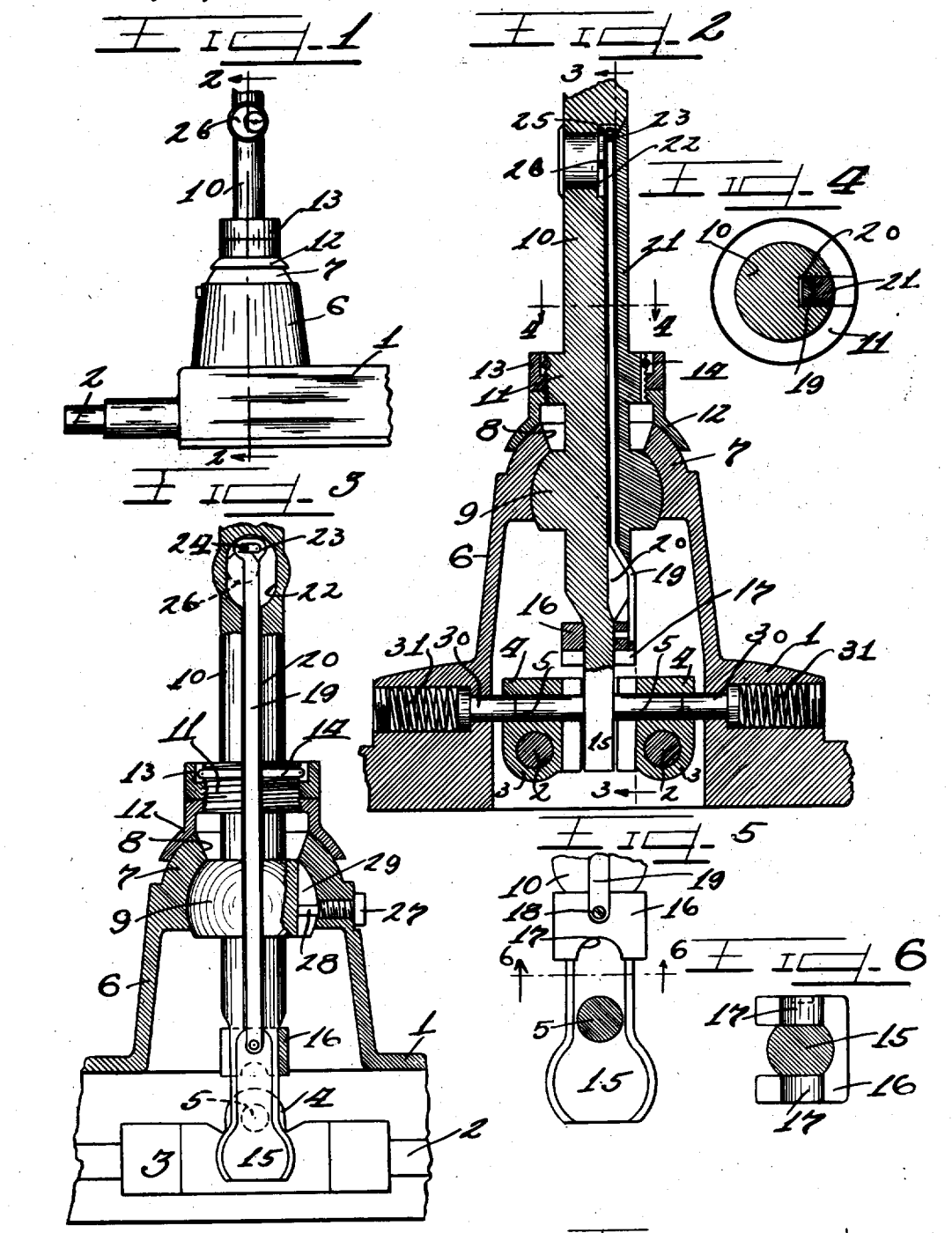
Witnesses
H. G. Fiske
Charles W. Hills Jr.
Inventor
Colyer L. Johnson
by Charles W. Hills
Atty.

UNITED STATES PATENT OFFICE.

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

GEAR-SHIFT-LEVER LOCK.

15,105. Specification of Reissued Letters Patent. Reissued May 17, 1921.

Original No. 1,299,954, dated April 8, 1919, Serial No. 146,336, filed February 3, 1917. Application for reissue filed December 4, 1920. Serial No. 428,418.

*To all whom it may concern:*

Be it known that I, COLVIN L. JOHNSON, a citizen of the United States, and a resident of the city of Chicago, in the county of Cook and State of Illinois, have invented certain new and useful Improvements in Gear-Shift-Lever Locks; and I do hereby declare that the following is a full, clear, and exact description of the same, reference being had to the accompanying drawings, and to the numerals of reference marked thereon, which form a part of this specification.

This invention relates to an improved form of a gear shift lever lock, wherein the locking mechanisms are mounted in the interior of the gear shift lever and upon the lower inclosed end of the lever and operate to lock the lever against movement, thereby preventing the retraction of spring controlled pins which are movably engaged within a stationary support with the detached ends of said pins projecting through blocks slidable on the gear shift rods of a transmission mechanism when the locking mechanisms are in release position.

It is an object of this invention to construct a gear shift lever for automobiles having a locking mechanism therein adapted to engage between slidable gear shift blocks to prevent retraction of pins movably engaged within said blocks and within stationary supports, said pins when projected preventing operation of said gear shift blocks.

It is also an object of this invention to provide a locking mechanism for a gear shift lever wherein a locking block slidably mounted on the lower end of the lever is adapted to be actuated to engage between slidable blocks to prevent operation of retractable pins associated with said blocks.

It is an important object of this invention to construct an inclosed gear shift lever locking mechanism adapted to be actuated by a key to move a locking bolt between slidable blocks to prevent retraction of said blocks and when projected adapted to prevent movement of the lever.

It is furthermore an object of this invention to provide an inclosed key-operated lock for a gear shift lever of a motor car wherein the gear shift lever is locked from movement in a neutral position by the engagement of a part of the lock between locking blocks movably engaged on the gear shift rods.

It is also an object of this invention to construct an inclosed gear shift lever locking device for motor cars to lock or unlock the lever in neutral position only by the use of a key for the purpose.

Other and further important objects of the invention will be apparent from the disclosures in the drawings and specification.

The invention (in a preferred form) is illustrated in the drawings and hereinafter more fully described.

On the drawings:

Figure 1 is an elevational view partly broken away showing a gear shift lever mechanism equipped with a lock embodying the principles of my invention.

Fig. 2 is an enlarged detail section taken on line 2—2 of Fig. 1, with parts shown in elevation, and with parts broken away.

Fig. 3 is a vertical section taken on line 3—3 of Fig. 2, with parts shown in elevation.

Fig. 4 is an enlarged horizontal section taken on line 4—4 of Fig. 2.

Fig. 5 is an enlarged elevational view of one side of the lower end of the gear shift lever, and showing one of the pins in section.

Fig. 6 is a section taken on line 6—6 of Fig. 5.

As shown in the drawings:

The reference numeral 1 represents a housing mounted upon the top of a transmission gear shift case (not shown) and projecting longitudinally through said housing are stationary rods 2, spaced a short distance from one another and each having slidably engaged thereon within the housing 1, a notched or recessed gear shift block 3, on the upper central edge of which is integrally formed an upwardly directed ear or projection 4, for movably mounting a pin extension 5 in horizontal position at right angles to the gear shift rods 2, and with its inner end held projected into the space afforded between the blocks 3, as clearly shown in Fig. 2, by means of a headed member 30 slidable in the stationary housing 1 and controlled by a spring 31, said pin extension 5 and member 30 together constituting a split locking pin. Formed integrally upon the top of the housing 1, and projecting upwardly therefrom, is a hollow globular or socket receptacle casing 6, the outer upper portion of which is dome-shaped as designated by the reference numeral 7, and is provided with a central aperture or opening 8, which communicates with a socket, or ball shaped, receptacle within the dome 7 for movably receiving seated therein the ball portion 9 of a gear shift lever 10 projecting upwardly through said opening 8, and upon which is integrally formed a short distance above the ball portion 9, an outwardly threaded enlarged circular flange 11.

To hold the ball portion 9 seated within the dome 7, a bell-shaped ring 12 is threaded onto the flange 11 for a distance sufficient to permit the lower or bell-shaped portion of the ring 12 to movably fit over the upper part of the dome 7, with the lower edge or rim of the ring disposed a short distance above the lower portion of the dome to permit a universal movement of the ring 12 over the dome 7, when the lever 10 is actuated. To lock the ring 12 in position, a collar 13 and a washer 14 are threaded upon the upper end of the flange 11, with the collar 13 seated upon the upper portion of the ring 12.

Integrally formed on the lower end of the lever 10, a short distance below the ball portion 9, is a flat tail piece 15, which extends downwardly into the housing 1, and, for neutral position of the lever, lies between the inner ends of the pin extensions 5, as shown in Fig. 2. Slidably mounted upon the tail 15 is a locking block 16, having a semi-circular notch 17 formed at the lower end of each of two opposite sides thereof adapted to fit over or seat upon the pin extensions 5, to lock the tail 15 and the entire gear shift lever 10 from movement when the locking block 16 is in its lowermost position between the ears 4 of the blocks 3. Recessed into one side of the locking block 16, and secured thereto by means of a screw 18, or other suitable means, is a long upwardly extending locking or latch bar 19, bent inwardly to fit within a long passage 20, formed longitudinally within the lever 10.

Formed in the upper end of the gear shift lever 10 is a chamber 22 communicating with the upper end of the passage 20, and into which projects the upper end of the latch bar 19, which has integrally formed thereon a slotted head 23, to co-act with a pin 24, formed on a rounded projection 25, on the barrel 26 of a pin lock mounted within the chamber 22.

The operation is as follows:

In the neutral position of the gear shift lever 10, the tail piece 15 projects downward between the inner ends of the pin extensions 5. In order to shift the gears a composite movement of the gear shift lever 10 is necessary, that is, the lever must be thrown to one side and either forwardly or rearwardly for the purpose, the tail piece 15 contacting the end of one of the pin extensions 5, forcing the same inwardly against the action of its controlling spring 31 and the member 30 until the abutting ends of the pin extension and bolt are positioned between the slidable block 3 and the inner wall of the housing 1, to permit the lever to engage in the notch of a block 3 to slidably move the same to shift the gears. To prevent rotation of the gear shift lever 10 within the casing 6, a retaining screw 27 is threaded through the wall of said casing so that its inner pin end 28, which is of reduced diameter, projects into a slot 29, cut vertically in one side of the ball portion 9, as clearly shown in Fig. 3.

In the unlocked position of the lever 10, the rounded projection 25, of the lock barrel 26, is directed upwardly with the pin 24 at one end of the slot in the latch bar head 23, thus holding the latch bar 19 elevated with the locking block 16 in release position. To lock the lever 10 from movement, it is first moved to neutral position, and by means of a key inserted in the pin lock, the barrel 26 is rotated, with the pin 24, sliding to the other end of the slotted head 23, thus forcing the latch bar 19 downwardly and moving the locking block 16, on the tail piece 15, between the ears 4, of the blocks 3, to its lowermost position wherein the notches 17 engage around the pin extensions 5 to hold the lever locked against movement, thus preventing theft of an automobile equipped with such a lock, or interference with the gear shift mechanisms thereof. When the locking bolt or block 16 is in its lower locking position between the gear shift blocks 3 the lever cannot be moved transversely to push the pin extensions 5 back into the blocks 3 to move the spring-impelled members 30 out of engagement with the gear shift blocks. Since the pin extensions 5 cannot be operated, the members 30 engaging in the gear shift blocks 3 hold said blocks locked against movement longitudinally on the rods 2, thereby locking the gear shift lever against movement in vertical position.

To unlock the device it is only necessary to insert the key in the lock, and by turning the barrel 26, in an opposite direction the latch bar 19 is drawn upwardly, thus moving the locking block 16 out of engagement with the gear shift blocks into release position, as shown in Figs. 2 and 3.

I am aware that numerous details of construction may be varied through a wide range without departing from the principles of this invention, and I therefore do not purpose limiting the patent granted otherwise than necessitated by the prior art.

I claim as my invention:

1. In a gear shift lever lock of the class described the combination with a gear shift lever, of locking means therein, a notched locking block actuatable thereby, and locking pins adapted to be engaged by said notched locking block to hold the gear shift lever locked from movement.

2. In a device of the class described the combination with a gear shift lever, of locking means therein, a locking block slidable on said lever connected to said locking means, and pins connected with the gear shift mechanism of an automobile adapted to be engaged by said locking block to lock the gear shift lever from movement.

3. In a device of the class described the combination with a gear shift lever, of a notched locking block slidable thereon, locking pins mounted therebelow disposed on opposite sides of said gear shift lever, and key-operated means within said gear shift lever connected with said locking block to move the same downwardly into a position with said notches engaging around said pins to hold the lever locked from movement.

4. In a device of the class described the combination with the gear shift rods of an automobile, of blocks mounted thereon, locking pins movably connected with said blocks, a gear shift lever projecting downwardly between said blocks and in neutral position disposed between adjacent ends of said pins, a notched locking member slidable on said lever, and key-operated means within said lever connected with said locking member to move the same downwardly between said blocks into a position to seat upon said pins to hold the lever in neutral position locked against movement.

5. In a device of the class described adapted for use on an automobile the combination with a ball and socket gear shift lever, of locking means slidably mounted on the lower end thereof, key-operated mechanisms within said lever connected to actuate said locking means, and locking pins on the gear shift rods of the automobile adapted to be engaged by said locking means when actuated by said mechanisms to hold said lever locked in neutral position.

6. The combination with a passaged gear shift lever, locking means within said passage, notched means slidable on said lever connected to said locking means, and members disposed on opposite sides of said lever below said notched means adapted to fit into said notched means when the same is moved downwardly by said locking means to hold the lever locked against movement.

7. In a device of the class described, pins removably mounted on the gear shift rods of an automobile, a gear shift lever having its lower end disposed between adjacent ends of said pins in neutral position, and inclosed locking means associated with said lever adapted to engage said pins to hold the lever locked from movement in neutral position.

8. In a gear shift lever lock of the class described, means movably mounted on the gear shift rods of an automobile, a gear shift lever, and a mechanism thereon adapted to engage said means to hold said lever locked against movement.

9. In a gear shift lever lock, means mounted on the gear shift rods of an automobile, a gear shift lever, locking means associated therewith, and mechanisms connected with said lever to move said locking means into engagement with said gear shift means to lock said lever from movement.

In testimony whereof I have hereunto subscribed my name in the presence of two subscribing witnesses.

COLVIN L. JOHNSON.

Witnesses:
FRED E. PAESLER,
EARL M. HARDINE.